(12) United States Patent
Agarwal

(10) Patent No.: US 6,903,394 B2
(45) Date of Patent: Jun. 7, 2005

(54) CMOS IMAGER WITH IMPROVED COLOR RESPONSE

(75) Inventor: Vishnu K. Agarwal, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/305,075

(22) Filed: Nov. 27, 2002

(65) Prior Publication Data

US 2004/0099892 A1 May 27, 2004

(51) Int. Cl.[7] .............................................. H01L 31/072
(52) U.S. Cl. ...................... 257/292; 257/291; 257/440
(58) Field of Search ................................. 257/291–293, 257/440

(56) References Cited

U.S. PATENT DOCUMENTS

| | | | |
|---|---|---|---|
| 4,316,946 A | 2/1982 | Masters et al. | |
| 4,419,421 A | 12/1983 | Wichelhaus et al. | |
| 4,671,618 A | 6/1987 | Wu et al. | |
| 4,800,526 A | 1/1989 | Lewis | |
| 4,942,459 A | * 7/1990 | Hieda et al. | 348/227.1 |
| 5,272,359 A | 12/1993 | Nagasubramanian et al. | |
| 5,314,772 A | 5/1994 | Kozicki | |
| 5,798,745 A | * 8/1998 | Steffensmeier | 345/92 |
| 6,005,619 A | 12/1999 | Fossum | |
| 6,072,716 A | 6/2000 | Jacobson et al. | |
| 6,097,022 A | 8/2000 | Merrill et al. | |
| 6,137,100 A | 10/2000 | Fossum et al. | |
| 6,204,524 B1 | 3/2001 | Rhodes | |
| 6,211,510 B1 | 4/2001 | Merrill et al. | |
| 6,310,366 B1 | 10/2001 | Rhodes et al. | |
| 6,326,652 B1 | 12/2001 | Rhodes | |
| 6,369,853 B1 | 4/2002 | Merrill et al. | |
| 6,407,440 B1 | 6/2002 | Rhodes | |
| 6,410,899 B1 | 6/2002 | Merrill et al. | |
| 6,452,633 B1 | 9/2002 | Merrill et al. | |
| 6,469,364 B1 | 10/2002 | Kozicki | |
| 6,473,332 B1 | 10/2002 | Ignatiev et al. | |
| 6,487,106 B1 | 11/2002 | Kozicki | |
| 6,489,992 B2 | * 12/2002 | Savoye | 348/340 |
| 6,512,544 B1 | 1/2003 | Merrill et al. | |
| 6,512,858 B2 | 1/2003 | Lyon et al. | |
| 6,611,037 B1 | 8/2003 | Rhodes | |
| 6,636,261 B1 | 10/2003 | Pritchard et al. | |
| 2002/0123170 A1 | 9/2002 | Moore et al. | |
| 2002/0127886 A1 | 9/2002 | Moore et al. | |
| 2002/0163828 A1 | 11/2002 | Krieger et al. | |
| 2002/0168820 A1 | 11/2002 | Kozicki | |
| 2002/0190350 A1 | 12/2002 | Kozicki | |
| 2003/0001229 A1 | 1/2003 | Moore et al. | |
| 2003/0027416 A1 | 2/2003 | Moore | |
| 2003/0035314 A1 | 2/2003 | Kozicki | |
| 2003/0035315 A1 | 2/2003 | Kozicki | |
| 2003/0136989 A1 | * 7/2003 | Amiotti et al. | 257/296 |

FOREIGN PATENT DOCUMENTS

| | | |
|---|---|---|
| WO | WO-98/19455 | 5/1998 |
| WO | WO-99/65248 | 12/1999 |

OTHER PUBLICATIONS

Helbert et al., *Intralevel hybrid resist process with submicron capability*, SPIE vol. 333 Submicron Lithography, pp. 24–29 (1982), no month given.

(Continued)

Primary Examiner—Allan R. Wilson
(74) Attorney, Agent, or Firm—Dickstein Shapiro Morin & Oshinsky LLP

(57) ABSTRACT

CMOS image sensors have charge storage capacitors connected to various light sensitive and/or electrical elements. The capacity of the capacitors used for each pixel is tailored to the color to be detected. Charge storage capacitors may be formed entirely over a field oxide region of the CMOS imager, entirely over an active area of a pixel sensor cell, or partially over a field oxide region and partially over an active pixel area of a pixel sensor cell.

32 Claims, 7 Drawing Sheets

OTHER PUBLICATIONS

Kozicki, et al., "Applications of Programmable Resistance Changes in Metal–doped Chalcogenides", Proceedings of the 1999 Symposium on Solid State Ionic Devices, Editors—E.D. Wachsman et al., The Electrochemical Society, Inc., 1–12 (1999), no month given.

Kozicki, et al., *Nanoscale effects in devices based on chalcogenide solid solutions,* Superlattices and Microstructures, 27, 485–488 (2000), no month given.

Kozicki, et al., *Nanoscale phase separation in Ag–Ge–Se glasses,* Microelectronic Engineering, vol. 63/1–3, 155–159 (2002), no month given.

M.N. Kozicki and M. Mitkova, *Silver Incorporation in thin films of selenium rich Ge–Se glasses,* Proceedings of the XIX International Congress on Glass, Society for Glass Technology, 226–227 (Jul. 2001).

* cited by examiner

CMOS IMAGER WITH IMPROVED COLOR RESPONSE

FIELD OF THE INVENTION

The present invention relates to improved semiconductor imaging devices and, in particular, to a CMOS imager employing a storage capacitor for storing accumulated pixel signals.

BACKGROUND OF THE INVENTION

CMOS imagers have been increasingly used as low cost imaging devices. A filly compatible CMOS sensor technology enabling a higher level of integration of an image array with associated processing circuits is beneficial in many digital imaging applications such as, for example, cameras, scanners, machine vision systems, vehicle navigation systems, video telephones, computer input devices, surveillance systems, auto focus systems and star trackers, among many others.

In a conventional (4T) CMOS imager, the active elements of a pixel cell perform the necessary functions of: (1) photon to charge conversion; (2) accumulation of image charge at a storage node; (3) transfer of charge from the node to an output transistor accompanied by charge amplification; (4) resetting the storage node to a known state before accumulation of image charge and selective output of reset and pixel image signals. A transfer transistor may also be used to transfer charge from a photo conversion element to the output transistor. The photosensitive element of a CMOS imager pixel is typically either a depleted p-n junction photodiode or a field induced depletion region beneath a photogate.

Exemplary CMOS imaging circuits as well as detailed descriptions of the functions of various CMOS elements of an imaging circuit are described, for example, in U.S. Pat. No. 6,204,524 to Rhodes, U.S. Pat. No. 6,310,366 to Rhodes et al., and U.S. Pat. No. 6,326,652 to Rhodes, the disclosures of which are incorporated herein by reference CMOS imagers typically suffer from poor signal-to-noise ratios and poor dynamic range as a result of the inability to fully store and utilize the electric charge collected by the photosensitive area. Consequently, storage capacitors have been proposed for use in connection with the light sensitive node of a CMOS pixel sensor cells to improve collected charge storage. For example, U.S. Pat. No. 6,204,524 to Rhodes describes in detail the formation of planar and trench storage capacitors electrically connected in parallel with the light sensitive node of a CMOS pixel sensor cell.

Storage capacitors may also provide useful results when electrically connected to other light sensitive and/or electrical elements of the pixel sensor cell, such as transistor gates or floating diffusion regions, for example, to affect the operation and characteristics of such various light sensitive and/or electrical elements. Capacitors connected to such various light sensitive and/or electrical elements of the pixel sensor cell help amplify the signal of an imager transistor, increase the storage capacitance of a photosite, or provide a low noise decoupling capacitor. Such storage capacitors are described in co-pending U.S. patent application Ser. No. 10/303,896, filed Nov. 26, 2002, by Howard E. Rhodes and Jeff McKee, entitled "CMOS IMAGER PIXEL DESIGNS", the entire disclosure of which is incorporated herein by reference. While the use of storage capacitors at various locations within a pixel improve pixel operation, those capacitors have the same capacitance value for each pixel color and are not optimized for the photon to charge conversion characteristics of each color pixel.

SUMMARY OF THE INVENTION

The present invention provides CMOS imagers having storage capacitors of selected capacitance connected to various light sensitive and/or electrical elements of a pixel sensor cell of a CMOS imager. The size of each capacitor is optimized based on the color to be detected by the pixel to which it is connected.

Also provided are methods of forming the pixels of CMOS imagers containing charge storage capacitors in which capacitance values are associated with each of the pixel colors.

The presence of a capacitor, and the size of any capacitor employed, is determined based on the color response of the pixel to which the capacitor is connected. Generally, the capacitors fall within the range of 1–50 femtofarads ($10^{-15}$ farads). In an RGB color pixel arrangement, for example, most preferably, red pixels will utilize the smallest capacitors, about 0–20 femtofarads, green pixels will utilize a middle range, about 2–20 femtofarads, and blue pixels will utilize the largest capacitors, about 3–20 femtofarads. The capacitors are sized in relation to the electron production of each colored pixel. Red pixels produce the fewest electrons, and therefore have the smallest, or no, capacitor. Blue pixels produce the most electrons, and therefore have the largest capacitor. Green pixels produce electrons in an amount between red and blue. Sizing the capacitor in relation to electron production allows a greater percentage of each capacitor to be utilized. By employing capacitors sized in relation to the electron production of each color pixel, the sensitivity of each pixel circuit is increased.

Additional advantages and features of the present invention will be apparent from the following detailed description and drawings which illustrate preferred embodiments of the invention.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

The terms "wafer" and "substrate" are to be understood as a semiconductor-based material including silicon, silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "wafer" or "substrate" in the following description, previous process steps may have been utilized to form regions or junctions in the base semiconductor structure or foundation. In addition, the semiconductor need not be silicon-based, but could be based on silicon-germanium, germanium, gallium arsenide or other semiconductor material.

The term "pixel" refers to a picture element unit cell containing a photosensor and transistors for converting light radiation to an electrical signal. For purposes of illustration, a representative pixel is illustrated in the figures and description herein and, typically, fabrication of all pixels in an imager will proceed simultaneously in a similar fashion.

Methods of manufacturing the pixels disclosed herein are taught in related U.S. patent application Ser. No. 10/303,896, filed Nov. 26, 2002, in the names of Howard E. Rhodes and Jeff McKee, and entitled "CMOS IMAGER PIXEL DESIGNS," the disclosure of which is incorporated herein by reference.

Figure 1:
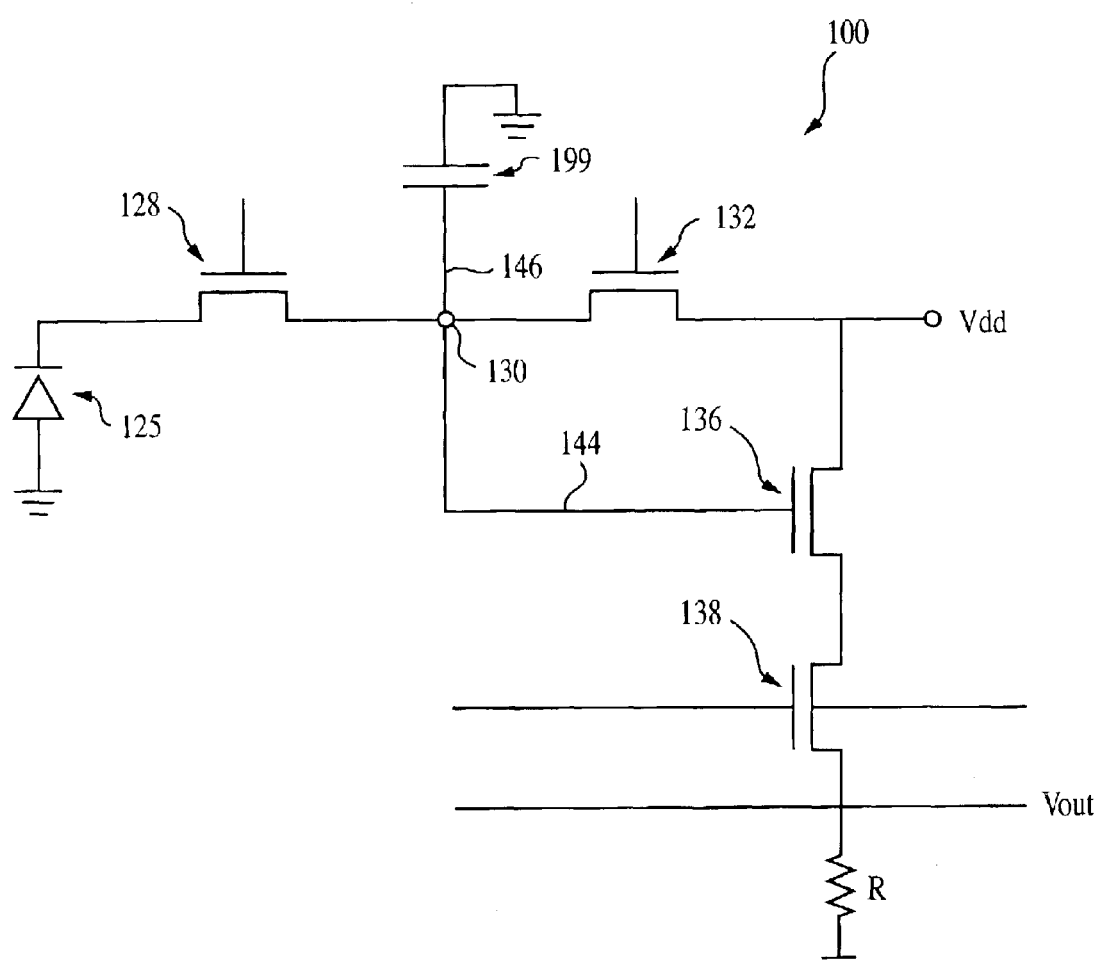
FIG. 1 is a schematic diagram of a pixel sensor cell in accordance with a first embodiment of the present invention.

Referring now to the drawings, where like elements are designated by like reference numerals, FIG. 1 illustrates a first exemplary embodiment of the invention. A pixel sensor cell 100 is illustrated having a storage capacitor 199 overlying a field oxide region, and electrically connected to a floating diffusion region 130 and to ground. As explained in more detail below, storage capacitor 199 is formed so that it does not block any light sensitive areas of the imager. In addition, storage capacitor 199 is formed overlying the field oxide region entirely, without blocking the floating diffusion region 130. Alternatively, however, the storage capacitor 199 also may be formed entirely over the active pixel area, or only partially over the field oxide area and partially over the active area, as desired.

It should be noted that, although the invention will be described below largely in connection with use in a four-transistor (4T) pixel cell which is depicted in FIG. 1, the invention also has applicability to a three-transistor (3T) cell as well as other configurations. The 3T cell differs from the 4T cell in the omission of a charge transfer transistor, as described further below.

Referring to FIG. 1, the storage capacitor 199 is electrically connected between floating diffusion region 130 and ground. Alternatively, capacitor 199 can be connected between floating diffusion region 130 and a voltage source. The four transistors illustrated in FIG. 1 can be identified by their gates, as follows: transfer transistor gate 128, reset transistor gate 132, source follower transistor gate 136 and row select transistor gate 138. In the arrangement shown in FIG. 1, storage capacitor 199 amplifies signals collected by a photo diode 125.

The size of storage capacitor 199 is determined based on the color to be detected by the pixel. According to an exemplary embodiment of the present invention, the pixels form part of an imaging array based on an additive red-green-blue color space. Alternatively, other color arrangements could be utilized, such as a subtractive cyan-yellow-magenta color space.

Figure 9:
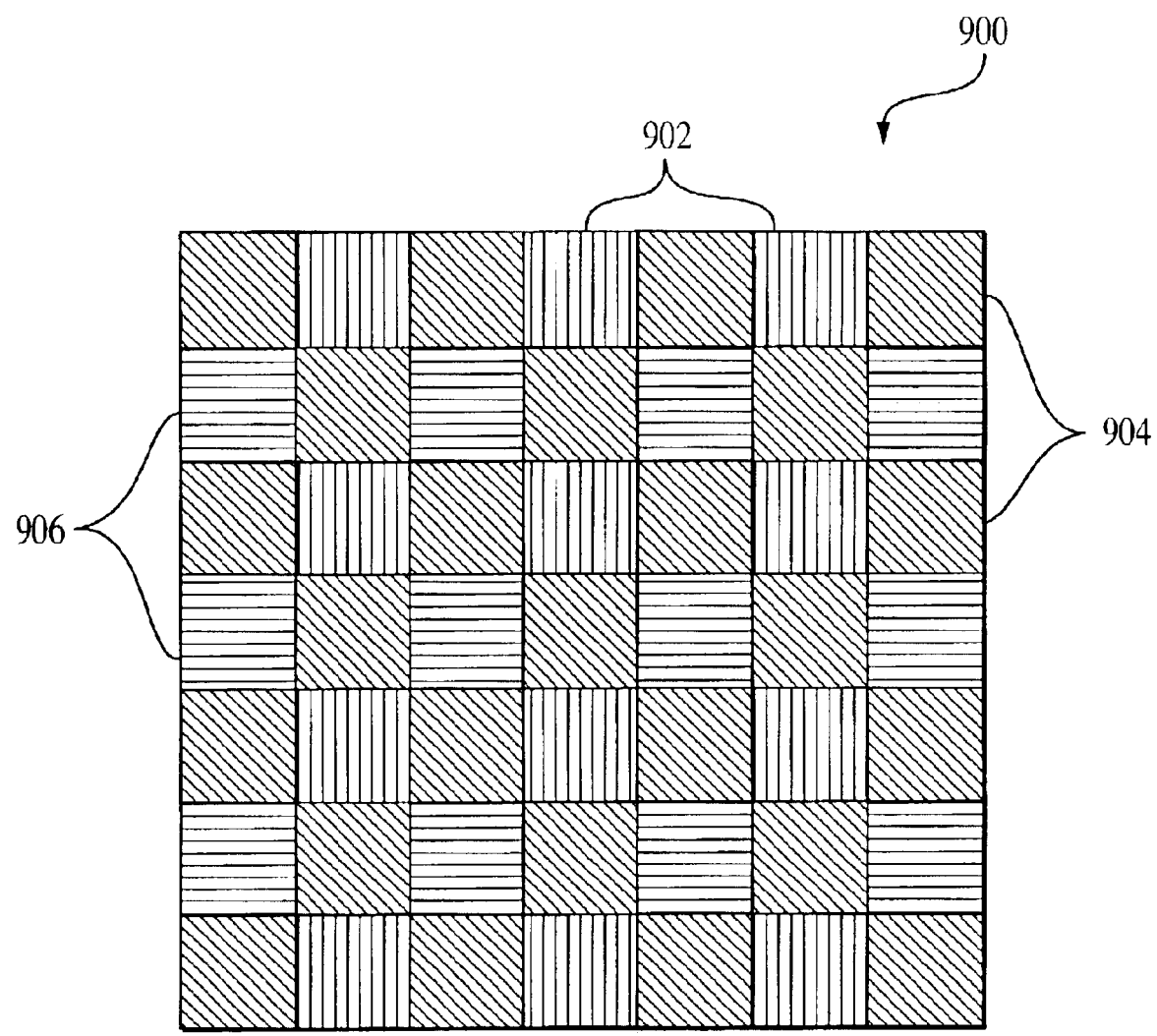
FIG. 9 is an illustration of a Bayer filter used in conjunction with a pixel sensor array of the present invention.

A filter, such as Bayer filter 900 shown in FIG. 9, is arranged over the pixels. The Bayer filter pattern alternates a row of green and red filters with a row of blue and green filters. In FIG. 9, red filters 902 are designated with vertical hatching, green filters 904 are designated with left diagonal hatching, and blue filters 906 are designated with horizontal hatching. The filters provide colored light to each pixel. According to the present invention, pixels designated to detect red light are provided with a storage capacitor 199 having a small size in the range of about 0–20 femtofarads. Pixels designated to detect green light have a medium size in the range of about 2–20 femtofarads. Pixels designated to detect blue light have a large size in the range of about 3–20 femtofarads.

Figure 2:
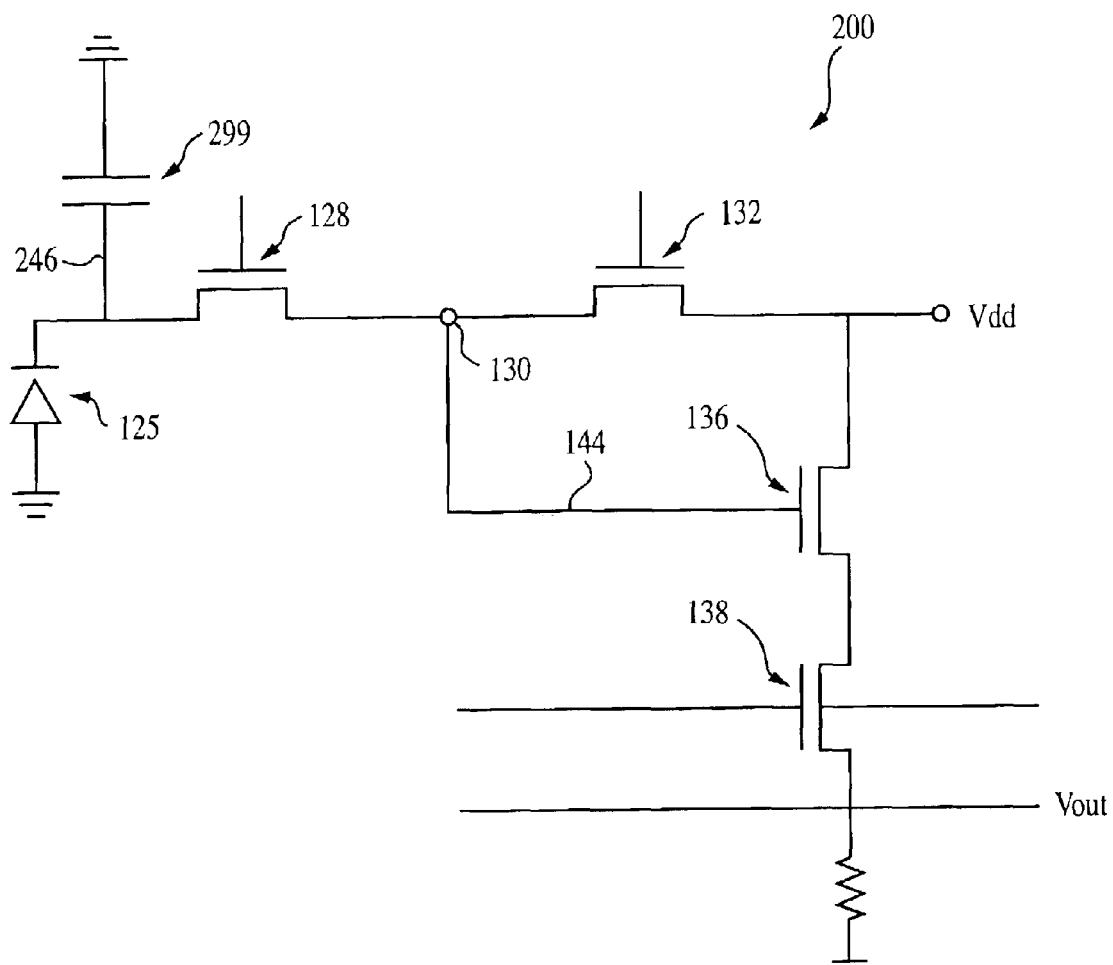
FIG. 2 is a schematic diagram of a pixel sensor cell fabricated in accordance with a second embodiment of the present invention.

The structure of a pixel cell 200 of a second embodiment of the present invention is illustrated with reference to FIG. 2. It should be understood that similar reference numbers correspond to similar elements as previously described with reference to FIG. 1. The structure of FIG. 2 differs from the above-described embodiment in that storage capacitor 299 is formed in contact with the photodiode 125 and not with the floating diffusion region 130, as in the previous embodiment. Processing of the second embodiment is similar to the processing used to produce the previous embodiment, except that a metal contact is formed that connects an electrode of the storage capacitor 299 to a doped transfer region of the photodiode, and not to the floating diffusion region 130, as in the above-described embodiment. Again, the storage capacitor 299 may be formed entirely or only partially over the field oxide region as well as entirely or only partially over the active area of the pixel sensor cell. If the storage capacitor 299 is formed entirely over the field oxide region, the advantage is that the storage capacitor 299 improves the charge storage capacity of the imager without reducing the size of the photosensitive area.

Once again, the capacitor 299 is sized in accordance with the color of the pixel in the manner described above with reference to FIG. 1. Thus, capacitor 299, for pixels designated to detect red light, has a small size in the range of 0–20 femtofarads. In pixels designated to detect green light, capacitor 299 has a medium size in the range of about 2–20 femtofarads. In pixels designated to detect blue light, capacitor 299 has a large size in the range of 3–20 femtofarads.

Figure 3:
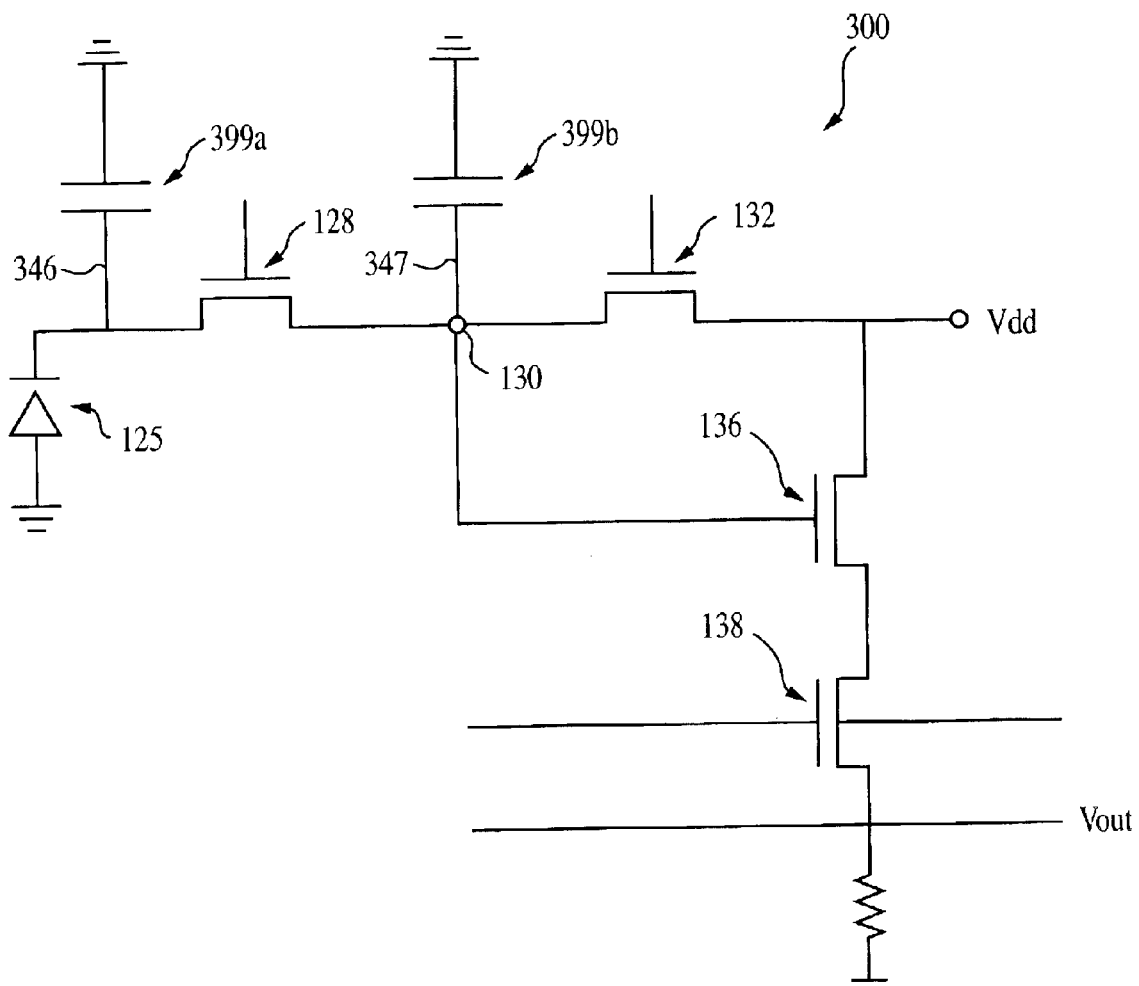
FIG. 3 is a schematic diagram of a pixel sensor cell fabricated in accordance with a third embodiment of the present invention.

FIG. 3 illustrates yet another embodiment of the present invention according to which two different storage capacitors are connected to two different elements of pixel sensor cell 300. For example, FIG. 3 depicts storage capacitor 399a, which is connected to the photodiode 125, and storage capacitor 399b, which is connected to the floating diffusion region 130. Both storage capacitors 399a, 399b of pixel sensor cell 300 (FIG. 3) may be formed totally overlying the field oxide region, without reducing the photosensitive area of the pixel cell, or only partially over the field oxide region. Storage capacitors 399a, 399b of pixel sensor cell 300 also may be formed totally overlying the photosensitive area of the pixel cell, or only partially over the active area.

Once again, the capacitors 399a, 399b are sized in accordance with the color of the pixel in the manner described above with reference to FIG. 1. Thus, capacitors 399a, 399b for pixels designated to detect red light, have a small size combined in the range of 0–20 femtofarads. In pixels designated to detect green light, capacitor 399a, 399b have a medium size in the range of about 2–20 femtofarads. In pixels designated to detect blue light, capacitor 399a, 399b have a large size in the range of 3–20 femtofarads.

The processing for the formation of the storage capacitors 399a, 399b of pixel sensor cell 300 of FIG. 3 are similar to the processing steps for the embodiment described above, except that two capacitors (and not one capacitor) are formed over the field oxide region. In addition, contact 346 (FIG. 3) and contact 347 (FIG. 3) connect each of the lower electrodes of the storage capacitors 399a, 399b to the doped transfer region and to the floating diffusion region 130, respectively. Preferably, contacts 346, 347 are formed of a conductive material, such as doped polysilicon, or a metal such as titanium/titanium nitride/tungsten. Photolithographic techniques are used to define the areas to be etched out to form the holes for the contacts 346, 347 wherein the conductive material is subsequently depositing therein.

Although FIG. 3 illustrates only two storage capacitors 399a, 399b, it must be understood that the present invention is not limited to this embodiment. Accordingly, the invention contemplates the formation of a plurality of such storage capacitors which are formed entirely or only partially over the field oxide region, and which are further connected to various light sensitive and/or electrical elements of the pixel sensor cell. The combined capacitances of the storage capacitors is selected based on the color to be detected by the associated pixel.

Figure 4:
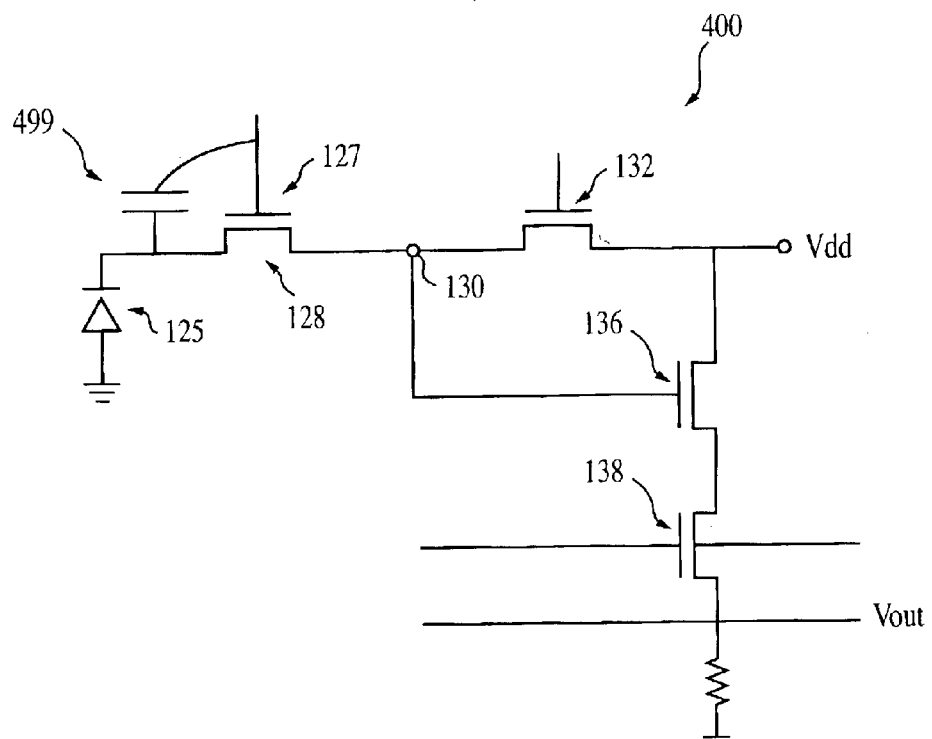
FIG. 4 is a schematic diagram of a pixel sensor cell fabricated in accordance with a fourth embodiment of the present invention.
Figure 5:
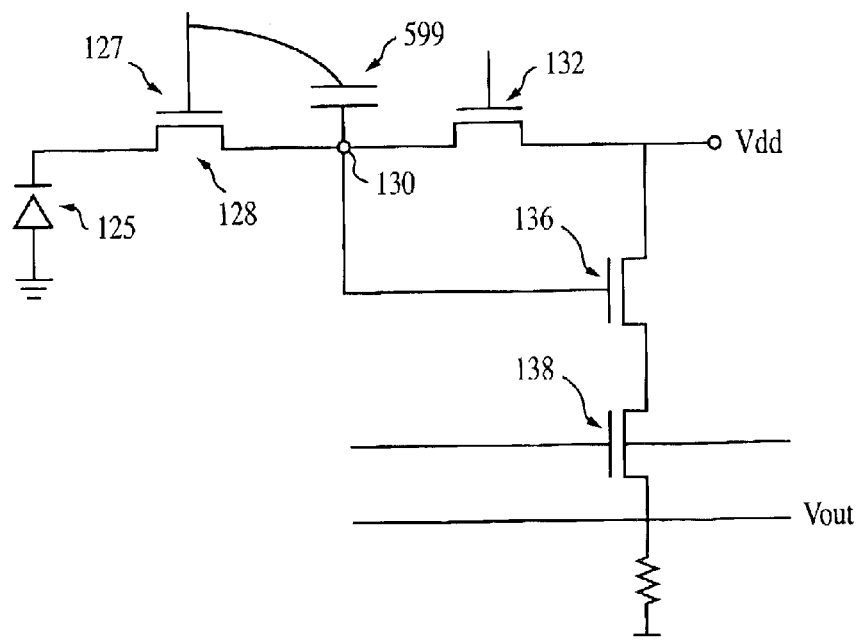
FIG. 5 is a schematic diagram of a pixel sensor cell fabricated in accordance with a fifth embodiment of the present invention.
Figure 6:
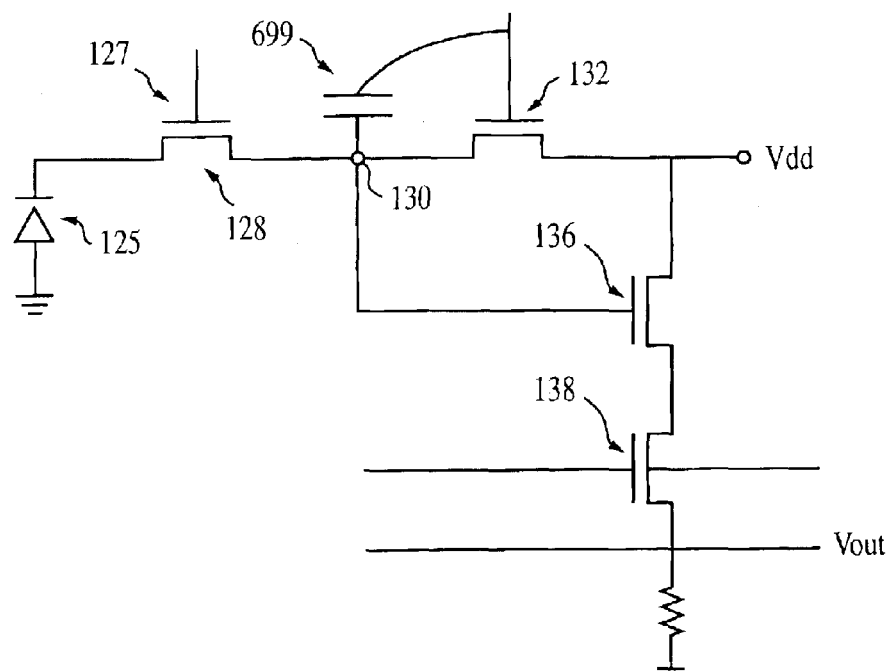
FIG. 6 is a schematic diagram of a pixel sensor cell fabricated in accordance with a sixth embodiment of the present invention.

FIGS. 4–6 illustrate additional embodiments of the present invention, according to which a storage capacitor is connected not to a ground source, as in the previous embodiments, but rather to a gate of one of the four transistors of the 4T cell. For example, FIG. 4 illustrates storage capacitor 499 formed entirely or partially over the field oxide region, and connected to both the photodiode 125 and to the gate stack 127 of transfer transistor 128. In another exemplary embodiment, FIG. 5 depicts storage capacitor 599 formed over the field oxide region and also connected to both the floating diffusion region 130 and to the gate stack 127 of transfer transistor 128. According to yet another exemplary embodiment, storage capacitor 699 of FIG. 6 is formed over the field oxide region and is further connected to both the floating diffusion region 130 and to a gate of reset transistor 132.

Thus, capacitors 499, 599, and 699 for pixels designated to detect red light, each have a small size in the range of 0–20 femtofarads. In pixels designated to detect green light, capacitors 499, 599 and 699 have a medium size in the range of about 2–20 femtofarads. In pixels designated to detect blue light, capacitors 499, 599 and 699 have a large size in the range of 3–20 femtofarads.

Thus, capacitor 799 for pixels designated to detect red light, have a small size in the range of 0–20 femtofarads. In pixels designated to detect green light, capacitor 799 has a medium size in the range of about 2–20 femtofarads. In pixels designated to detect blue tight, capacitor 799 has a large size in the range of 3–20 femtofarads.

In each of the embodiments depicted in FIGS. 4–6, the processing steps for the fabrication of the storage capacitors 499, 599, and 699 are similar to the processing steps used to manufacture the other embodiments, except that the upper electrode of each of the storage capacitors 499, 599, and 699 is connected not to a ground potential, as in the first embodiment, but rather to another element of the CMOS imager, for example, a gate of one of the four transistors of the pixel sensor cell, as described above.

Figure 7:
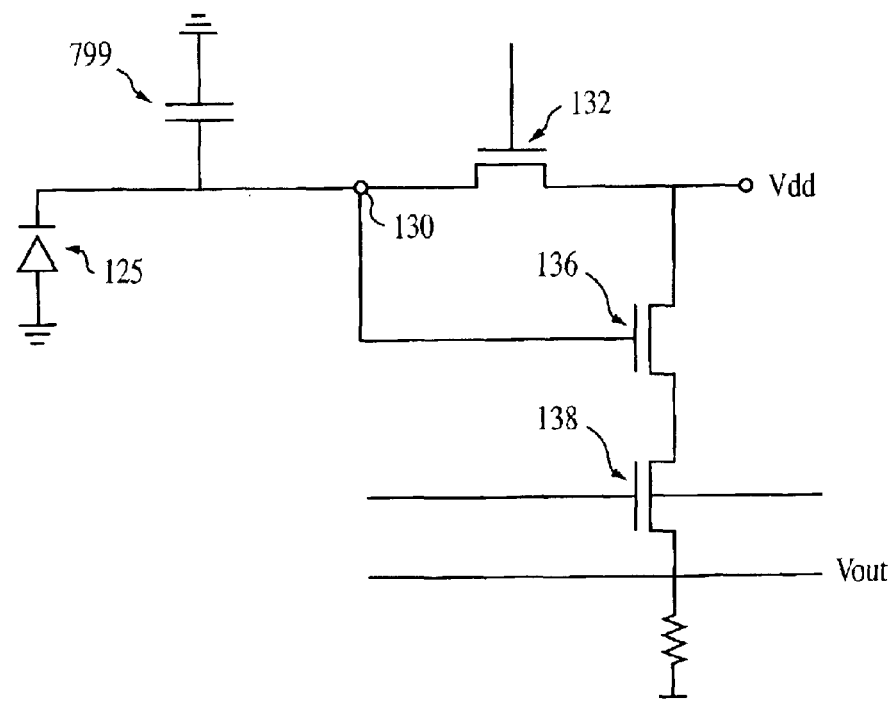
FIG. 7 is a schematic diagram of a pixel sensor cell fabricated in accordance with a seventh embodiment of the present invention.

FIG. 7 illustrates yet another embodiment of the present invention, according to which a storage capacitor 799 is formed over the field oxide region 115 as part of a three-transistor (3T) cell and not a four-transistor (4T) cell, as previously described with reference to FIG. 2, for example. The only difference between the structure of FIG. 7 and that of FIG. 2 is that the structure of FIG. 2 contains an additional fourth transistor, that is transfer transistor 128. Thus, storage capacitor 799 of FIG. 7 may be also formed entirely or only partially over the field oxide region 115 and connected to the photodiode 125 and the floating diffusion region 130. The processing steps for the fabrication of the storage capacitor 799 are similar to the processing steps required to manufacture the other embodiments described above, except that the storage capacitor 799 is formed by itself over the field oxide region, and not simultaneously with the transfer gate of the transfer transistor.

Figure 8:
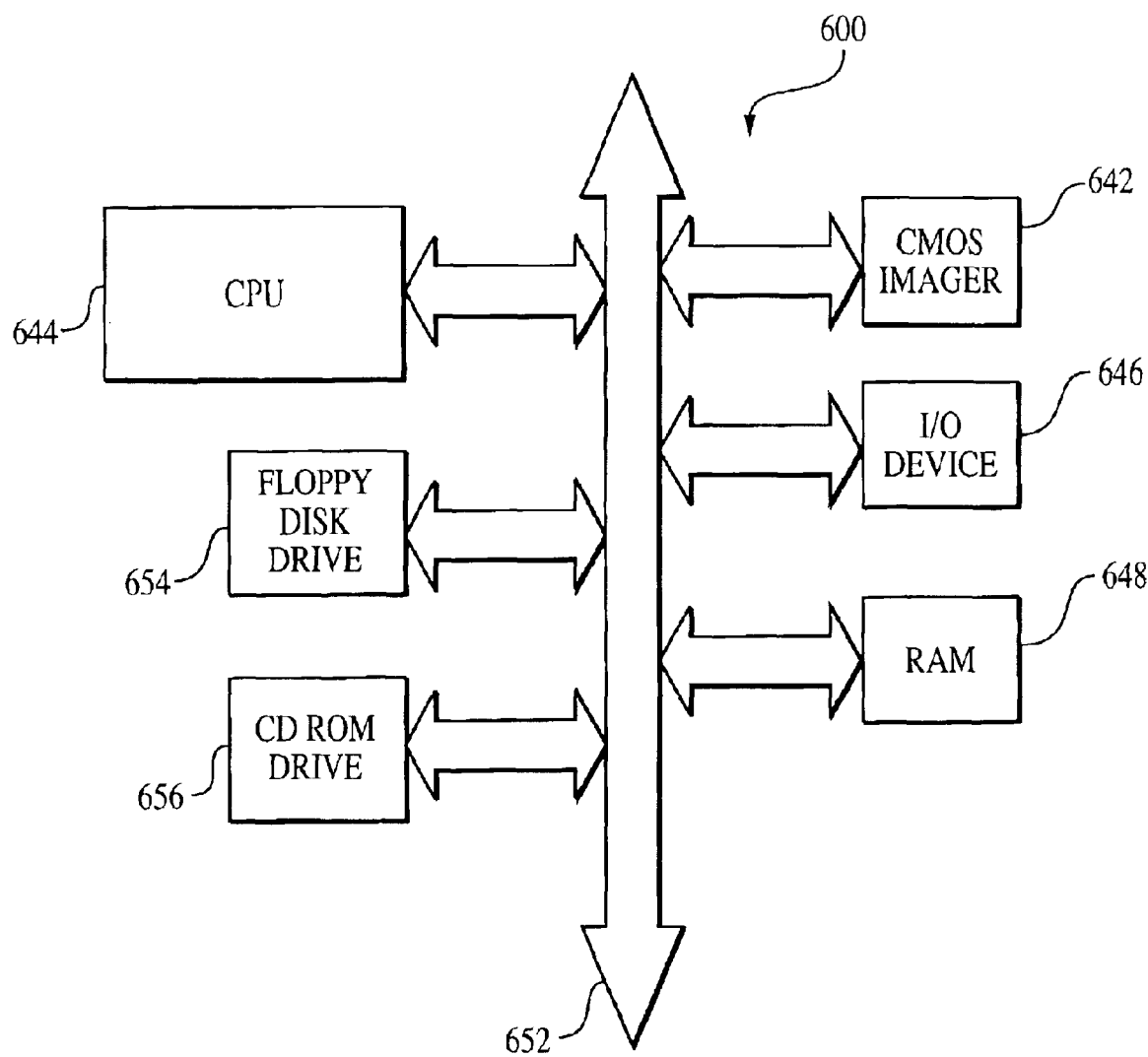
FIG. 8 is an illustration of a processing system utilizing the pixel sensor cells of the present invention.

A typical processor system 600, which includes a CMOS image sensor 42 having an array of pixels having the construction described above as shown in FIG. 8. The processor system is exemplary of a system having digital circuits which could include a CMOS image sensor. Without being limiting, such a system could include a computer system, camera system, scanner, machine vision, vehicle navigation, video phone, surveillance system, auto focus system, star tracker system, motion detection system, image stabilization system and data compression system for high-definition television, all of which can utilize the present invention.

A processor system, such as a computer system, for example generally comprises a central processing unit (CPU) 644, for example, a microprocessor, that communicates with one or more input/output (I/O) devices 646 over a bus 652. The CMOS image sensor 642 also communicates with the system over bus 652. The computer system 600 also includes random access memory (RAM) 648, and, in the case of a computer system may include peripheral devices such as a floppy disk drive 654, and a compact disk (CD) ROM drive 656 or a flash memory card 657 which also communicate with CPU 644 over the bus 652. It may also be desirable to integrate the processor 654, CMOS image sensor 642 and memory 648 on a single IC chip.

The above description and drawings are only to be considered illustrative of exemplary embodiments, which achieve the features and advantages of the invention. Modification and substitutions to specific process conditions and structures can be made without departing from the spirit and scope of the invention. Accordingly, the invention is not to be considered as being limited by the foregoing description and drawings, but is only limited by the scope of the appended claims.

It should be noted again that, although the invention has been described with specific reference to CMOS imaging circuits having a photogate and a floating diffusion region, the invention has broader applicability and may be used in any CMOS imaging apparatus. Also, although exemplary capacitor structures have been described and illustrated, many variations in capacitor structures could be made. Similarly, the processes described above are only exemplary of many that could be used to produce the invention. For example, although the invention has been described above with reference to the formation of planar capacitors, the invention also has application to other capacitor structures, such as trench capacitors, for example.

Accordingly, the above description and accompanying drawings are only illustrative of exemplary embodiments that can achieve the features and advantages of the present invention. It is not intended that the invention be limited to the embodiments shown and described in detail herein. The invention is limited only by the scope of the following claims.

What is claimed as new and desired to be protected by Letters Patent of the United States is:

1. An imaging pixel comprising:
    a photosensor for converting photo energy into electrical charges;
    a charge collection region for collecting said electrical charges from said photosensor;
    an output transistor having a gate electrically connected to said charge collection region for converting said electrical charges produced by said photosensor into an electrical signal; and
    a capacitor for storing said electrical charges in electrical communication with at least one of said photosensor and said charge collection region, wherein the size of said capacitor is associated with the color response characteristics of said imaging pixel.

2. An imaging pixel as in claim 1, wherein the photosensor is responsive to red color, and the storage capacity of the capacitor is between about 0 and about 20 femtofarads.

3. An imaging pixel as in claim 1, wherein the photosensor is responsive to green color, and the storage capacity of the capacitor is between about 2 and about 20 femtofarads.

4. An imaging pixel as in claim 1, wherein the photosensor is responsive to blue color, and the storage capacity of the capacitor is between about 3 and about 20 femtofarads.

5. An imaging pixel according to claim 1, wherein said storage capacitor is a flat plate capacitor.

6. An imaging pixel according to claim 5, wherein said storage capacitor is a flat plate capacitor including a first electrode, a second electrode and a dielectric layer between said first and second electrodes.

7. An imaging pixel according to claim 6, further comprising a transfer transistor for transferring charge between said photosensor and said charge collection region.

8. An imaging pixel according to claim 7, wherein said second electrode of said storage capacitor is electrically connected to a gate of said transfer transistor.

9. An imager pixel according to claim 1, wherein said charge storage capacitor is electrically connected to said charge collection region.

10. An imager pixel according to claim 1, wherein said charge storage capacitor is electrically connected to said photosensor.

11. An imager pixel comprising:
    a photosensor;
    a charge collection region for collecting charge from said photosensor; and
    a charge storage capacitor electrically connected to at least one of said charge collection region and said photosensor, a storage capacity of the capacitor being based on the color response of the photosensor in correspondence with photosensor electron production.

12. An imager pixel according to claim 11, wherein said charge storage capacitor is formed fully over a field oxide region.

13. An imager pixel according to claim 11, wherein said charge storage capacitor is formed fully over an active area.

14. An imager pixel according to claim 11, wherein said charge storage capacitor is formed partially over a field oxide region.

15. An imager pixel according to claim 11, wherein said charge storage capacitor is formed partially over an active area.

16. An imager pixel according to claim 11, wherein said storage capacitor is a flat plate capacitor including a first electrode, a second electrode and an insulating layer between said first and second electrodes.

17. An imager pixel according to claim 16, wherein said second electrode is further electrically connected to a gate of a transfer transistor which transfers charge from said photosensor to said charge storage region.

18. An imager pixel according to claim 11, wherein said photosensor is used in a CMOS imager.

19. A photosensor for use in an imaging device, said photosensor comprising:
    a photodiode;
    a charge collection region;
    a charge transfer region for transferring charge from said photodiode to said charge collection region; and
    a storage capacitor electrically connected to said charge collection region, a storage capacity of the capacitor being selected based on the color response of the photosensor in correspondence with photosensor electron production.

20. The photosensor according to claim 19, wherein said storage capacitor is formed at least partially over at least one of a field oxide region and an active area.

21. The photosensor according to claim 19, wherein said storage capacitor is formed entirely over said field oxide region.

22. The photosensor according to claim 19, wherein said storage capacitor is formed entirely over an active area.

23. The photosensor according to claim 19, further comprising a source follower transistor for outputting charge accumulated in said charge collection region which has been transferred to said charge collection region, wherein the gate of said source follower transistor is electrically coupled to said charge collection region.

24. The photosensor according to claim 19, wherein said photosensor is used in a CMOS imager.

25. An imaging sensor comprising an array of imaging pixels, each imaging pixel comprising:
    a photosensor for converting photo energy into electrical charges;
    a charge collection region for collecting the electrical charges from the photosensor;
    an output transistor having a gate electrically connected to the charge collection region for converting the electrical charges produced by the photosensor into an electrical signal; and
    a capacitor for storing the electrical charges in electrical communication with at least one of the photosensor and the charge collection region, wherein the size of the capacitor is determined by the respective color being detected by the pixel in correspondence with photosensor electron production.

26. An imaging sensor as in claim 25, wherein the photosensor is responsive to red color, and the storage capacity of the capacitor is between about 0 and about 20 femtofarads.

27. An imaging sensor as in claim 25, wherein the photosensor is responsive to green color, and the storage capacity of the capacitor is between about 2 and about 20 femtofarads.

28. An imaging sensor as in claim 25, wherein the photosensor is responsive to blue color, and the storage capacity of the capacitor is between about 3 and about 20 femtofarads.

29. A CMOS imager system comprising:

a processor; and an array of imaging pixels in electrical communication with the processor, each imaging pixel comprising:

a photosensor for converting photo energy into electrical charges;

a charge collection region for collecting the electrical charges from the photosensor;

an output transistor having a gate electrically connected to the charge collection region for converting the electrical charges produced by the photosensor into an electrical signal; and a capacitor for storing the electrical charges in electrical communication with at least one of the photosensor and the charge collection region, wherein the size of the capacitor is determined by the respective color being detected by the pixel in correspondence with photosensor electron production.

30. An imaging system as in claim 29, wherein the photosensor is responsive to red color, and the storage capacity of the capacitor is between about 0 and about 20 femtofarads.

31. An imaging system as in claim 29, wherein the photosensor is responsive to green color, and the storage capacity of the capacitor is between about 2 and about 20 femtofarads.

32. An imaging system as in claim 29, wherein the photosensor is responsive to blue color, and the storage capacity of the capacitor is between about 3 and about 20 femtofarads.

* * * * *